United States Patent [19]

Higginbottom

[11] 4,028,367

[45] June 7, 1977

[54] HIGH EFFICIENCY STABLE AQUEOUS RESOLES

[75] Inventor: Harold P. Higginbottom, Wilbraham, Mass.

[73] Assignee: Monsanto Company, St. Louis, Mo.

[22] Filed: Mar. 10, 1975

[21] Appl. No.: 556,596

[52] U.S. Cl. .............................. 260/29.3; 260/57 R; 260/57 A; 260/57 C
[51] Int. Cl.$^2$ ........................................ C08L 61/06
[58] Field of Search .............. 260/29.3, 57 C, 57 R, 260/57 A

[56] References Cited

UNITED STATES PATENTS

| | | | |
|---|---|---|---|
| 2,593,926 | 4/1952 | Simons | 260/57 C |
| 3,206,412 | 9/1965 | Kirkpatrick et al. | 260/57 R |

*Primary Examiner*—J. Ziegler
*Attorney, Agent, or Firm*—Joseph S. Nelson; William J. Farrington; James C. Logomasini

[57] ABSTRACT

High efficiency stable aqueous resoles which contain low concentration of free phenol and free formaldehyde and cause substantially less pollution of the atmosphere than prior art resins. The resoles are prepared by a two-stage reaction which controls the molecular weight, water tolerance and the ratio of methylolated 2,2'-, 2,4'- and 4,4'-dihydroxydiphenylmethanes. Stability is promoted by inhibition of the crystallization of bis(4-hydroxy-3,5-dimethylolphenyl)methane.

14 Claims, No Drawings

HIGH EFFICIENCY STABLE AQUEOUS RESOLES

BACKGROUND OF THE INVENTION

1. Field of the Invention

The present invention is directed to stable aqueous solutions of high efficiency phenol-formaldehyde resins and to a process for preparing the solutions.

2. Description of the Prior Art

A high efficiency single phase aqueous phenol-formaldehyde resin is one which has low free phenol and low saligenin (ortho-hydroxy benzyl alcohol) and can be aptly described as one in which a high percentage of the organic moiety of the aqueous resin is retained when the resin is cured. Free phenol and saligenin volatilize in the curing of the resin, reducing the efficiency and the performance of the resin in various bonding applications. A high efficiency resin is extremely valuable to the industry since it results in a greater economic advantage over conventional resins. Even more important is the increase in performance of the resin in bonding applications. However, one of the unfortunate drawbacks with a high efficiency single phase aqueous phenol-formaldehyde resin is the instability of the resin which results in the formation of a solid or crystal phase. This crystal phase is extremely difficult to dissolve and prevents uniform application of the resin to substrates. Heating the resin to elevated temperatures will help to re-dissolve the crystal phase, but, unfortunately, such exposure to high temperatures will also advance the resin and affect its dilutability characteristics thereby affecting its application performance. Filtering out the crystals is uneconomic, reduces the efficiency of the resin and impairs the bonding characteristics.

The prior art (U.S. Pat. No. 3,428,593) teaches stable, high efficiency, single phase, aqueous phenol formaldehyde resins and a process for making them by reacting phenol and formaldehyde under controlled reaction conditions and a controlled excess of free formaldehyde. The resin is first prepared by reacting phenol and formaldehyde in certain critical proportions in the presence of a critical proportion of a basic catalyst. The reaction is continued until an end point of less than 5 weight percent of free phenol is obtained based on the weight of the phenol-formaldehyde resin solids. The free formaldehyde content is then adjusted to at least 3.0 weight percent by the post addition of formaldehyde thereto. The addition of this formaldehyde keeps the resin stable by driving the equilibrium reaction of formaldehyde and bis (4-hydroxy-3, 5-dihydroxymethylphenyl) methane in the direction of forming at least the mono-hemiformal of bis (4-hydroxy-3, 5-dihydroxymethylphenyl) methane, to prevent the formation of crystals of bis (4-hydroxy-3, 5-dihydroxymethylphenyl) methane. This method of preparing stable high efficiency aqueous phenol formaldehyde resins was a valuable advance in the art. However, the free phenol and free formaldehyde content of such resins are relatively high and their presence in the effluents from the resin applicator's plant can contribute to atmospheric pollution.

A need therefore exists for high efficiency stable, single phase, aqueous phenol-formaldehyde resins which contain low concentrations of phenol and formaldehyde and thus cause substantially less pollution of the atmosphere than prior art resins.

SUMMARY OF THE INVENTION

The above-mentioned need in the art is fulfilled with an aqueous solution of a resole wherein the solution has a pH less than 8.5 and contains less than 2 percent of free phenol and less than 2 percent of free formaldehyde based on the weight of the resole and wherein the resole has a number average molecular weight of less than 300 and a combined formaldehyde to phenol molar ratio in the range of 2.0:1 to 2.9:1 and contains sufficient methylolated 2,2'- and 2,4'-dihydroxydiphenylmethanes to inhibit crystal formation in the resole.

Another aspect of the invention is directed to a process for preparing an aqueous resole solution which comprises:

a. reacting 1.0 mole phenol with from 0.05 to 0.30 moles formaldehyde under conditions for formation of novolac resin, b. adding from 1.75 to 3.5 moles formaldehyde and reacting under basic conditions to produce a resole of molecular weight less than 300, and containing less than 2 weight percent free phenol, and c. adjusting the pH of the resole to less than 8.5.

The resins are manufactured by a carefully controlled two-stage process which gives storage stable resins of controlled structure and molecular weight. Because of the high ratio of formaldehyde to phenol (2:1 and greater) and because the two-stage reaction provides an efficient method of obtaining a high ratio of combined formaldehyde to phenol, the free phenol content is reduced to a low value of less than 2 weight percent of the resole and concomitantly the free formaldehyde content falls to a low value which can be further reduced by adding a formaldehyde scavenger towards the end of the resole reaction.

THE PREFERRED EMBODIMENTS

The aqueous solutions of resoles of the present invention are prepared by a two-stage reaction. The first stage of the reaction is carried out under novolac forming conditions. Acid conditions are preferred and are obtained with an acid catalyst of a pK less than 5° at 25° C., soluble in the reaction medium. From 0.05 to 0.30 moles of formaldehyde are reacted with one mole of phenol in this novolac stage. The formaldehyde to phenol ratio is kept low so that dimer formation is favored and formation of higher oligomers is suppressed. The acid catalyst is preferably a strong acid catalyst of pK less than 2 at 25° C. such as hydrochloric acid, sulphuric acid, oxalic acid, sulfamic acid, benzene sulfonic acid, toluene sulfonic acid or trifluoroacetic acid. It may be a salt of a divalent metal such as zinc chloride, zinc acetate, lead octoate and similar salts of carboxylic acid which are conventionally used for the preparation of high ortho novolacs. The concentration of acid catalyst is in the range of 0.001 to 0.02 mole equivalents per mole of phenol.

The novolac reaction is carried out at temperatures in the range of 60° to 200° C., the particular temperature being readily selected for the appropriate catalyst by the skilled worker in order to obtain novolac methylene bridged compounds. Normally with strong acid catalyst the reaction is carried out at atmospheric reflux at temperatures in the range of 100° to 120° C.

The acid stage reaction product is believed to be predominantly a mixture of the three methylene bridged dimers (2,2'-dihydroxydiphenylmethane, 2,4'- dihydroxydiphenylmethane and 4,4'-dihydroxydiphenylmethane). The dimer composition can be varied by modification of the acid stage catalyst and reaction conditions. Thus, when high ortho directing catalysts such as zinc acetate and other salts of divalent metals are used the reaction should be carried out at elevated temperatures in order to break ortho-benzyl ether groups and form a high concentration of 2,2'-dimer. Strong acids at atmospheric reflux yield a ratio of 2,2'-, 2,4'- and 4,4'-dimers of approximately 0.14 to 0.53 to 0.33. Dimer mixtures containing a high proportion of the 4,4'-dimer which are less desirable for the purposes of the invention can be obtained by reaction of formaldehyde with phenol in the presence of strong acids at low temperatures in the range of 50° to 60° C.

The methods of carrying out novolac reactions are well known in the art. Thus, the reaction may be effected by reaction of phenol and paraformaldehyde under anhydrous conditions with removal of water of condensation by azeotropic distillation or it may be carried out in the presence of water generated by the reaction or added to the reaction medium as an aqueous formalin solution containing between 30 and 70 percent formaldehyde.

The second stage or resole stage is conducted with a basic catalyst. Typically from 1.75 to 3.5 moles of formaldehyde per mole original phenol is added for the resole reaction and between 0.05 and 0.30 mole equivalent of base per mole of original phenol in excess of the amount required to neutralize any acid which may have been used at the novolac stage. The reaction is carried out at a temperature range of from 40° to 80° C. with the preferred range being 50° to 70° C. so that an adequate rate of reaction may be obtained without excessive oligomerization of the resole. The reaction is continued until the combined formaldehyde to phenol ratio determined by conventional methods is in the range of 2.0 to 2.9.

The resole reaction may also be carried out under anhydrous or hydrous conditions. However, since many of the applications of the resole in treatment or impregnation of substrates require the viscosity of the resole to be low, since low viscosity is conveniently obtained with aqueous solutions of the resole, and since water as solvent does not contribute to pollution when the solution is dried, it is generally preferred to carry out the resole reaction with aqueous formalin solutions containing between 30 and 70 percent formaldehyde. When the reaction is complete, the solids content of the aqueous resole is adjusted to the range of 40 to 70 percent by addition of water or by vacuum stripping to remove water, to provide solutions of a viscosity in the range which is readily handled in shipping and pumping operations.

The catalyst for the resole stage is a conventional basic catalyst of pK greater than 9° at 25° C., soluble in the reaction medium. Typical bases include alkali metal hydroxides such as lithium hydroxide, sodium hydroxide and potassium hydroxide; alkali metal carbonates such as sodium carbonate and potassium carbonate; alkaline earth hydroxides such as magnesium hydroxide, calcium hydroxide and barium hydroxide; aqueous ammonia and amines of molecular weight less than 300. At the end of the reaction the catalyst is neutralized by addition of acid or acid salt to reduce the pH to between 6 and 8.5. For example when the catalyst is sodium hydroxide, phosphoric acid is commonly used for neutralization, and sulfuric acid is commonly used to neutralize barium hydroxide. Preferably the pH is adjusted to between 7 and 8.

As is well known in the art, the normal base catalyzed addition reaction of formaldehyde with phenol produces a mixture of 5 mono, di and tri-methylolated phenol monomers which are potential intermediates for dimer formation via condensation. In dimerization of these methylolated phenols the formation of bis(4-hydroxy-3,5-dimethylolphenyl) methane is favored when the ratio of formaldehyde to phenol is high, i.e., when it is above 2.0, substantial amounts of bis(4-hydroxy-3,5-dimethylolphenyl) methane are formed. Even when the proportion of bis(4-hydroxy-3,5-dimethylolphenyl) methane is relatively low and the methylolated phenols are in relatively high concentration, the bis(4-hydroxy-3,5-dimethylolphenyl) methane crystallizes out from conventional resoles when the formaldehyde content is below 3 percent and the pH is adjusted to less than 8.5, particularly at lower pH in the range of 6 to 8 and at low temperatures in range of about 0-20° C. preferred for storage. This crystal phase is extremely difficult to redissolve. Elevated temperatures help to redissolve it but unfortunately exposure to high temperatures advances the resin, increasing its molecular weight and decreasing its water tolerance, so that its application performance is adversely effected. Filtering out the crystals is of little benefit because the resulting resin is reduced in efficiency and the bonding characteristics are impaired. Moreover, the economics of the process become unfavorable and a problem of disposing of bis(4-hydroxy-3,5-dimethylolphenyl) methane is created. By the methods of this invention, during the base stage condensation, the 2,2'-, 2,4'- and 4,4'-dihydroxydiphenylmethanes formed during the acid stage, are methylolated in the same fashion as phenol. Thus the two-stage process introduces methylolated 2,2'- and 2,4'-dihydroxyphenylmethanes into the resole which, unlike methylolated phenols, unexpectedly suppress crystallization and precipitation of the bis(4-hydroxy-3,5-dimethylolphenol) methane and allow free formaldehyde to be reduced almost to zero without impairing the stability of the resole at normal storage temperatures and pH levels. Moreover, manipulation of the acid stage reaction, provides a method of controlling the molecular weight of the resole so that it can be limited to less than 300 and duplication of resoles of molecular weight in the range of 180 to 300 with a ratio of combined formaldehyde to phenol in the range of 2.0 to 2.9 and a reproducible water tolerance is more readily achieved than by prior art processes.

Water tolerance is determined at 25° C. by addition of water to the resole until a slight permanent haze forms. The tolerance is the weight of water exposed as a percent by weight of the resin solids. Thus, where the haze point occurs when 80 parts by weight of water impart haze to 20 parts by weight of resole resin solids, the tolerance is 400 percent. The resoles of the present invention are found to have a water tolerance in the range of 100 to 800 percent.

The amount of formaldehyde reacted with phenol during the acid stage is in the range of 0.05 to 0.30 mole per mole of phenol and is determined by the amount of methylolated dihydroxydiphenylmethanes needed to impart adequate storage stability and to control the properties of the final resole. The amount required varies with the final combined formaldehyde to phenol ratio in the resole and depends in part on the presence of additives and scavengers. Thus, when the combined formaldehyde to phenol is about 2.0, the amount of formaldehyde reacted in the acid stage can be as low as 0.05 mole per mole of phenol. When the combined formaldehyde to phenol is in the range of 2.5 to 2.9, the amount of formaldehyde reacted in the acid stage is advantageously as high as 0.30 mole per mole of phenol.

In general, when the molecular weight of the resole is in the range of 180 to 300, the resole contains between 5 and 90 weight percent of methylolated dihydroxydiphenylmethanes. In conventional resoles, the methylolated dihydroxydiphenylmethanes comprise almost exclusively bis(4-hydroxy-3,5-dimethylolphenyl) methane. As a result of the two-stage reaction of the present invention, as much as 80 percent of the methylolated dihydroxydiphenylmethanes may be comprised of methylolated 2,2'- and 2,4'-dihydroxydiphenylmethanes. However in practice, the initial novolac reaction is carried out with proportions of formaldehyde and phenol which yield final resole compositions containing between 5 and 50 weight percent of the methylolated di-hydroxydiphenylmethanes to provide stability to the aqueous resole. Because of the high ratio of formaldehyde combined with phenol in the resoles, the dimeric components average between 3 and 4 methylol groups per molecule.

The two-stage reaction allows the reaction of the formaldehyde and phenol to be carried almost to 100 percent completion without stability problems occurring. As a result the phenol content is reduced to below 2 percent based on the weight of resole and the formaldehyde content is correspondingly reduced or can be reduced to less than 2 weight percent of the resole by reaction with a formaldehyde scavenger prior to neutralization of the basic catalyst. Suitable formaldehyde scavengers include sodium sulfite, sodium cyanide and nitrogen containing organic compounds soluble in the resole, of molecular weight less than 300, containing at least 1 NH group per molecule reactive with formaldehyde. Examples include ammonia, primary and secondary amines, urea, substituted ureas, primary amides, dicyandiamide, guanidines and aminotriazines such as melamine, guanamine and benzo-guanamine. The formaldehyde scavenging reaction is carried out at the end of the resole reaction preferably at a temperature in the range of 20° to 60° C. to minimize oligomerization of the resole. The amount of scavenger added can vary within very wide limits, up to 0.6 mole per mole of phenol in the original reaction mixture. However, it is preferred to use between 0.5 and 1.5 mole equivalents of scavenger per mole of free formaldehyde present at the end of the resole reaction. The unique stability of the two-stage formaldehyde-phenol reaction product permits this unusually wide choice of scavenger and scavenger concentration and allows resoles to be produced with free formaldehyde and free phenol contents of 1 weight percent and less.

The stable single phase aqueous phenol-formaldehyde resins of this invention are particularly useful in applications which require low pollution potential on application. Because of the low levels of residual phenol and formaldehyde possible by this invention and the ability to use a variety of formaldehyde scavengers with the resin to further lower the formaldehyde content, undesirable volatiles generated by drying and curing the resole are significantly reduced. The aqueous resoles of the present invention also possess very little of the strong odor of phenol and formaldehyde and this lack of odor is readily apparent when the resole is applied from open dip tanks, or coaters onto substrates which are passed over drying rolls, through drying ovens, or into curing presses and ovens perhaps in poorly vented areas. Also, cured products produced with these resins are relatively free of residual odor caused by entrapped volatiles such as phenol, formaldehyde and their reaction products.

The aqueous resoles of this invention can be diluted with water up to the limit of the water tolerance and are useful in the impregnation of cellulosic sheet and woven fiber structures. Typical resin solids contents of the phenolic for impregnation can range from 10 to 50 percent resin solids. Impregnation is accomplished by any convenient means including dipping, coating, or the like. After impregnation, the substrate material is dried to lower volatiles content and then is heated to advance the resin to a desired degree. Typical quantities of resin in a treated substrate range from about 10 to 60 weight percent. Typical products in which the resin treated sheet or woven members are employed comprise automotive oil filters, air filters and fuel filters, the individual members being folded, convoluted, cut, etc., and then packaged in an appropriate filter cartridge, as all of those skilled in the art fully appreciate.

The following examples are set forth to illustrate the principles and practices of this invention to one skilled in the art. They are not intended to be restrictive but merely to be illustrative of the invention. Unless otherwise stated, all parts, percentages and ratios are on a weight basis. Solids are determined by the Owens solids method.

EXAMPLE I

ACID STAGE REACTION

A phenol formaldehyde acid catalyzed condensate is prepared by reacting 0.28 mole of aqueous formaldehyde (50 percent) per 1 mole of phenol in the presence of 0.004 mole of oxalic acid at atm. reflux until the formaldehyde consumption exceeds 98 percent.

BASE STAGE REACTION

The acid stage reaction product is neutralized with 0.2 moles of sodium hydroxide and 2.26 moles of aqueous formaldehyde (50 percent) is added. A base catalyzed reaction is conducted at 65° C. in the presence of 0.15 mole of calcium hydroxide until the unreacted formaldehyde content drops to 2.3 percent. The reaction is cooled to 40° C. and 0.075 mole of aqueous ammonia (29 percent) is added. The resin is neutralized to a pH of 7.6. The resin as made can be stored for greater than 1 month at 0° C. without any precipitation or phase separation. Resin properties are shown in Table I.

EXAMPLE II

BASE STAGE REACTION

No acid stage reaction is conducted. A base catalyzed aqueous resin is prepared by reacting 2.54 mole of aqueous formaldehyde (50 percent) per 1 mole of phenol in the presence of 0.02 mole of sodium hydroxide and 0.15 mole of calcium hydroxide at 65° C. The reaction is conducted until the unreacted formaldehyde content drops to 2.3 percent. The reaction is cooled to 50° C. and 0.075 mole of aqueous ammonia (29 percent) is added. The resin is neutralized to a pH of 7.6. The resin as made when stored overnight at 0° C. shows some precipitation of crystals. Crystallization becomes massive after 2–3 weeks. Resin properties are shown in Table I.

EXAMPLE III

ACID STAGE REACTION

A phenol-formaldehyde acid catalyzed condensate is prepared by reacting 0.08 mole of aqueous formaldehyde (50 percent) per 1.0 mole of phenol in the presence 0.004 mole equivalents of sulfamic acid at atm. reflux until the formaldehyde consumption exceeds 98 percent.

BASE STAGE REACTION

The acid stage reaction product is reacted in the presence of 0.10 equivalents of calcium hydroxide and 2.90 mole of formaldehyde (50 percent aqueous) at 70° C., until the unreacted formaldehyde drops to 6.8 percent. The reaction is cooled to 50° C. and 0.26 mole of aqueous ammonia (29 percent) and 0.55 mole of urea are added as formaldehyde scavengers. The resin is neutralized to a pH of 7.2 with an appropriate acid. The resin as made can be stored for greater than one month at 0° C. without any precipitation or phase separation. Resin properties are shown in Table I.

EXAMPLE IV

BASE STAGE REACTION

No acid stage reaction is conducted. A base catalyzed aqueous resin is prepared by reacting 2.98 mole of aqueous formaldehyde (50 percent) per 1 mole of phenol in the presence of 0.1 mole equivalents of calcium hydroxide at 70° C. reflux until the unreacted formaldehyde content drops to 6.7 percent. The reaction is cooled to 50° C. and 0.26 mole of aqueous ammonia (29 percent) and 0.55 mole of urea are added as formaldehyde scavengers. The resin is neutralized to a pH of 7.5 with an appropriate acid. The resin as made can only be stored for about one week before crystals begin to precipitate from solution. Resin properties are shown in Table I.

EXAMPLE V

Example I is repeated using 0.24 mole of aqueous formaldehyde (50 percent) per mole of phenol during acid stage. The base catalyzed stage is reacted at 60° C. with 2.10 mole of additional formaldehyde to a 1.6 percent formaldehyde end point. No ammonia or other formaldehyde scavengers are added. The reaction is neutralized to a pH of 7.4. The resin properties are summarized in Table I. This resin was stored below 5° C. for 7 months with no evidence of phase separation or precipitation. Properties are shown in Table I.

EXAMPLE VI

Example I is repeated using 0.28 mole of aqueous formaldehyde (50 percent) per 1.0 mole of phenol during the acid stage. The base catalyzed stage using 0.14 mole of calcium hydroxide and 2.07 mole of additional formaldehyde is reacted to a 1.8 percent formaldehyde end point at 60° C. The reaction is cooled to 50° C. and 0.064 mole of aqueous ammonia (29 percent) and 0.16 mole of urea are added. The product is neutralized to a pH of 7.9. Properties are shown in Table I.

EXAMPLE VII

Example I is repeated using 0.24 mole of aqueous formaldehyde (50 percent) per mole of phenol in the presence of 0.004 mole of sulfamic acid during the acid stage. The base catalyzed stage using 0.14 mole of calcium hydroxide and 2.34 mole of additional formaldehyde is reacted to a 3.5 percent formaldehyde end point at 60° C. The reaction is cooled to 50° C. and 0.064 mole of aqueous ammonia (29 percent) and 0.32 mole of urea are added. The product is neutralized to a pH of 7.9. Properties are shown in Table I.

EXAMPLE VIII

Example I is repeated using 0.16 mole of aqueous formaldehyde (50 percent) per mole of phenol in the presence of 0.004 mole of sulfamic acid during the acid stage. The base catalyzed stage using 0.14 mole of calcium hydroxide and 2.38 mole of additional formaldehyde is reacted to 2.2 percent formaldehyde end point at 65° C. The reaction is cooled to 55° C. and 0.15 mole of melamine is added and reacted at 55° C. for one half hour. Then 0.064 mole of aqueous ammonia (29 percent) is added. The product is neutralized to a pH of 8.0. Properties are summarized in Table I.

EXAMPLE IX

Example VIII is repeated except 0.11 mole of dicyandiamide is used in place of the melamine. Then .064 mole of aqueous ammonia (29 percent) and 0.16 mole of urea are added. The product is neutralized to a pH of 8.0. Properties are summarized in Table I.

The properties of the resoles are tabulated in Table I. The properties are measured directly on neutralized resin unless indicated otherwise. The values for the mole ratio of formaldehyde combined with phenol (combined F/P), degree of polymerization and number average molecular weight ($M_n$) are determined by nuclear magnetic resonance procedures as described in J. Polym. Sci. A-1,3, 1079 (1965). The stability of the aqueous resoles is measured on refrigerated samples at 0 to 5° C. and indicates the time in days to appearance of a crystalline phase or insolubles in the solution. The percent formaldehyde measurements on the reaction mixtures and final products are determined by the hydroxylamine hydrochloride test.

TABLE I

| EXAMPLE | COMPARISON OF PROPERTIES OF RESOLE EXAMPLES I–IX | | | | | | | | |
|---|---|---|---|---|---|---|---|---|---|
| | I | II | III | IV | V | VI | VII | VIII | IX |
| REACTANTS, MOLES PER MOLE OF PHENOL | | | | | | | | | |
| TOTAL FORMALDEHYDE | 2.54 | 2.54 | 2.98 | 2.98 | 2.34 | 2.35 | 2.58 | 2.54 | 2.54 |
| ACID STAGE FORMALDEHYDE | 0.28 | 0 | 0.08 | 0 | 0.24 | 0.28 | 0.24 | 0.16 | 0.16 |
| FORMALDEHYDE SCAVENGER | | | | | | | | | |
| AMMONIA | 0.075 | 0.075 | 0.26 | 0.26 | 0 | .064 | .064 | .064 | .064 |
| CO-REACTANT | 0 | 0 | 0.55(1) | 0.26(1) | 0 | 0.16(1) | 0.32(1) | 0.15(2) | 0.16(1) |
| | | | | | | | | | 0.11(3) |

TABLE I-continued
COMPARISON OF PROPERTIES OF RESOLE EXAMPLES I-IX

| EXAMPLE | I | II | III | IV | V | VI | VII | VIII | IX |
|---|---|---|---|---|---|---|---|---|---|
| RESOLE PROPERTIES | | | | | | | | | |
| pH | 7.6 | 7.6 | 7.2 | 7.5 | 7.4 | 7.9 | 7.9 | 8.0 | 8.0 |
| OWENS SOLIDS, % | 51.5 | 51.8 | 51.6 | 51.7 | 49.1 | 55.3 | 54.6 | 52.5 | 52.8 |
| BROOKFIELD VIS. CPS | 36 | 23 | 21 | 20 | 17 | 49 | 36 | 32 | 30 |
| WATER TOLERANCE, % | 300 | 1700 | 150 | 1500 | 300 | 310 | 290 | 360 | 340 |
| FREE PHENOL, % | 0.70 | 1.42 | 0.79 | 0.67 | 1.23 | 1.18 | 0.84 | 0.98 | 0.89 |
| FREE FORMALDEHYDE, % | 0.8 | 0.8 | 0.3 | 0.5 | 1.6 | .35 | 0.6 | 0.5 | 0.5 |
| COMBINED F/P | 2.30 | 2.38 | 2.28 | 2.29 | 2.15 | 2.10 | 2.22 | 2.30 | 2.30 |
| $M_n$ | 279 | 204 | 252 | 249 | 236 | 282 | 275 | 273 | 273 |
| DEGREE OF POLYMERIZATION | 1.80 | 1.26 | 1.63 | 1.59 | 1.55 | 1.90 | 1.80 | 1.76 | 1.76 |
| STABILITY, DAYS at 0–5° C. | >30 | 1 | >30 | ~7 | >30 | >30 | >30 | >30 | >30 |

CO-REACTANT
(1) urea
(2) melamine
(3) dicyandiamide

The data of Table I show the stability of the aqueous resoles of Examples I, III and V to IX which are prepared by the two-stage reaction process of the present invention. In comparison, Examples II and IV which are conventional resole compositions similar in molar ratios to the resoles of the present invention and possessing similar low values for free formaldehyde and free phenol, show phase separation within a short time after preparation. These conventional resoles are therefore unsuitable for shipping and storage because the crystalline components tend to block lines and filters, and they are unsuitable in application because the crystalline components impair uniformity of impregnation. When these conventional resoles are heated to redissolve the crystalline phase, they increase in molecular weight losing water tolerance and precipitating as tacky resinous substances so that application to substrates is impaired.

From the foregoing, it is obvious that many variations are possible in the practice of the invention, without departing from the spirit and scope thereof.

What is claimed is:

1. An aqueous solution of a resole wherein the solution has a pH in the range 6 to 8.5 and contains less than 2 percent of free phenol and less than 2 percent of free formaldehyde based on the weight of the resole and wherein the resole has a number average molecular weight of less than 300, a water tolerance between about 100 and 800 and a combined formaldehyde to phenol molar ratio in the range of 2.0:1 to 2.9:1 and contains sufficient methylolated 2,2'- and 2,4'-dihydroxydiphenylmethanes to inhibit crystal formation in the resole solution said resole being the product of:
   a. reacting 1.0 mole phenol with from 0.05 to 0.03 moles formaldehyde under conditions for formation of novolac resin,
   b. adding from 1.75 to 3.5 moles formaldehyde and reacting under basic conditions to produce a resole of molecular weight less than 300, and containing less than 2 weight percent free phenol, and
   c. adjusting the pH of the aqueous resole to between about 6 and 8.5.

2. The aqueous solution of claim 1 wherein the resole has a number average molecular weight in the range of 180 to 300 and comprises between 5 and 90 weight percent of methylolated dihydroxydiphenylmethanes of which between 5 and 50 weight percent are methylolated 2,2'- and 2,4'-dihydroxydiphenylmethanes.

3. The aqueous solution of claim 1 wherein the resole comprises less than 1 weight percent free phenol and less than 1 weight percent free formaldehyde.

4. The aqueous solution of claim 1 wherein reduction of formaldehyde to less than 2 percent based on the weight of the resole is achieved with a formaldehyde scavenger.

5. The aqueous solution of claim 4 wherein the scavenger is a soluble nitrogen organic compound of molecular weight less than 300, containing at least one N-H group per molecule which is reactive with formaldehyde said scavenger being selected from the group consisting of ammonia, primary and secondary amines, urea, substituted ureas, primary amides, dicyandiamide, guanidines and aminotriazines.

6. A process for preparing an aqueous resole solution which comprises:
   a. reacting 1.0 mole phenol with from 0.05 to 0.30 moles formaldehyde under conditions for formation of novolac resin,
   b. adding from 1.75 to 3.5 moles formaldehyde and reacting under basic conditions to produce a resole of molecular weight less than 300, and containing less than 2 weight percent free phenol, and
   c. adjusting the pH of the aqueous resole to between about 6 and 8.5, wherein said solution contains less than 2% of free phenol and less than 2% of free formaldehyde based on the weight of the resole and wherein the resole has a number average molecular weight of less than 300, a water tolerance between about 100 and 800 and a combined formaldehyde to phenol molar ratio in the range of 2.0:1 to 2.9:1 and contains sufficient methylolated 2,2'- and 2,4'-dihydroxydiphenylmethanes to inhibit crystal formation in the resole solution.

7. The process of claim 6 wherein the pH is adjusted to between about 7 and 8.

8. The process of claim 6 wherein the novolac reaction stage is carried out in the presence of 0.001 to 0.02 mole equivalents of a soluble acid catalyst per mole of phenol at a temperature in the range of 60° to 200° C. and wherein the acid has a pK of less than 5.

9. The process of claim 8 wherein the catalyst has a pK of less than 2 and wherein the temperature is in the range of 100° to 120° C.

10. The process of claim 6 wherein the resole reaction stage is carried out in the presence of a soluble basic catalyst of pK greater than about 9.0 at a temperature in the range of 40° to 80° C., the concentration of base being between about 0.05 to 0.3 mole equivalent per mole of phenol in excess of the amount required to neutralize the acid of the novolac reaction stage.

11. The process of claim 10 wherein the base is selected from the group consisting of alkali metal hydroxides, alkali metal carbonates, alkaline earth hydroxides, ammonia and amines of molecular weight less than 300.

12. The process of claim 6 wherein the resole reaction stage is carried out at a temperature in the range of 50° to 70° C.

13. The process of claim 6 wherein a soluble nitrogen containing organic compound of molecular weight less than 300 containing at least one N—H group reactive with formaldehyde is added as a formaldehyde scavenger to the resole after the free phenol content has dropped to less than 2 weight percent of the resole and is reacted with the free formaldehyde to reduce the formaldehyde concentration to less than 2 weight percent of the resole.

14. The process of claim 13 wherein the formaldehyde scavenging reaction is carried out at a temperature in the range of 20° to 60° C. and the scavenger is selected from the group consisting of ammonia, primary and secondary amines, urea, substituted ureas, primary amides, dicyandiamide, guanidines and aminotriazines.

* * * * *